United States Patent [19]

Ludwig

[11] 4,097,778
[45] Jun. 27, 1978

[54] HEADLAMP AUTOMATIC DELAY SYSTEM

[75] Inventor: George Ludwig, Troy, Mich.

[73] Assignee: Tom McGuane Industries, Inc., Farmington Hills, Mich.

[21] Appl. No.: 731,298

[22] Filed: Oct. 12, 1976

[51] Int. Cl.² .............................................. B60Q 1/02
[52] U.S. Cl. .................................. 315/82; 200/61.86; 200/82 D; 315/80
[58] Field of Search .......................... 315/82, 83, 80, 77; 200/61.86, 61.87, 61.88, 61.9, 82 D, 82 DA

[56] References Cited

U.S. PATENT DOCUMENTS

| | | | |
|---|---|---|---|
| 1,306,071 | 6/1919 | Maegly | 200/82 D |
| 1,946,226 | 2/1934 | McCaleb | 315/77 |
| 3,039,020 | 6/1962 | Sargent | 315/82 X |
| 3,058,030 | 10/1962 | Simpkins | 315/82 |
| 3,060,290 | 10/1962 | Gagan | 200/82 D |
| 3,125,702 | 3/1964 | Herridge, Jr. | 315/82 X |
| 3,156,792 | 11/1964 | Long | 200/83 |
| 3,286,058 | 11/1966 | Perhats | 200/82 R |
| 3,639,711 | 2/1972 | Jordan et al. | 200/83 |

*Primary Examiner*—Saxfield Chatmon, Jr.
*Attorney, Agent, or Firm*—Barnes, Kisselle, Raisch & Choate

[57] ABSTRACT

A headlamp delay device comprising a switch having spaced contacts, a switch contact member movable to successively engage the contacts at different positions and detent means for holding the contact member in each of the positions. A housing has a piston and diaphragm dividing the housing into two chambers. A passage associated with one of the said chambers for connection to a source of vacuum and an inlet is provided to the one chamber. An orifice is associated with the inlet to the chamber for connection to a source of pressure higher than that supplied through the vacuum. A spring yieldingly urges the piston means in a direction opposite to that which the vacuum tends to move the piston. A shaft extends through the housing through the piston means and is connected to the switch contact member. An energy storing device is associated with the piston and operable upon dissipation of the vacuum and functioning of the spring to store energy when the vacuum is being dissipated such that upon predetermined storage of energy, the energy storing device functions to move the shaft and in turn the contact member within the switch against the action of the detent means successively storing and moving the shaft from one detent position to another.

33 Claims, 15 Drawing Figures

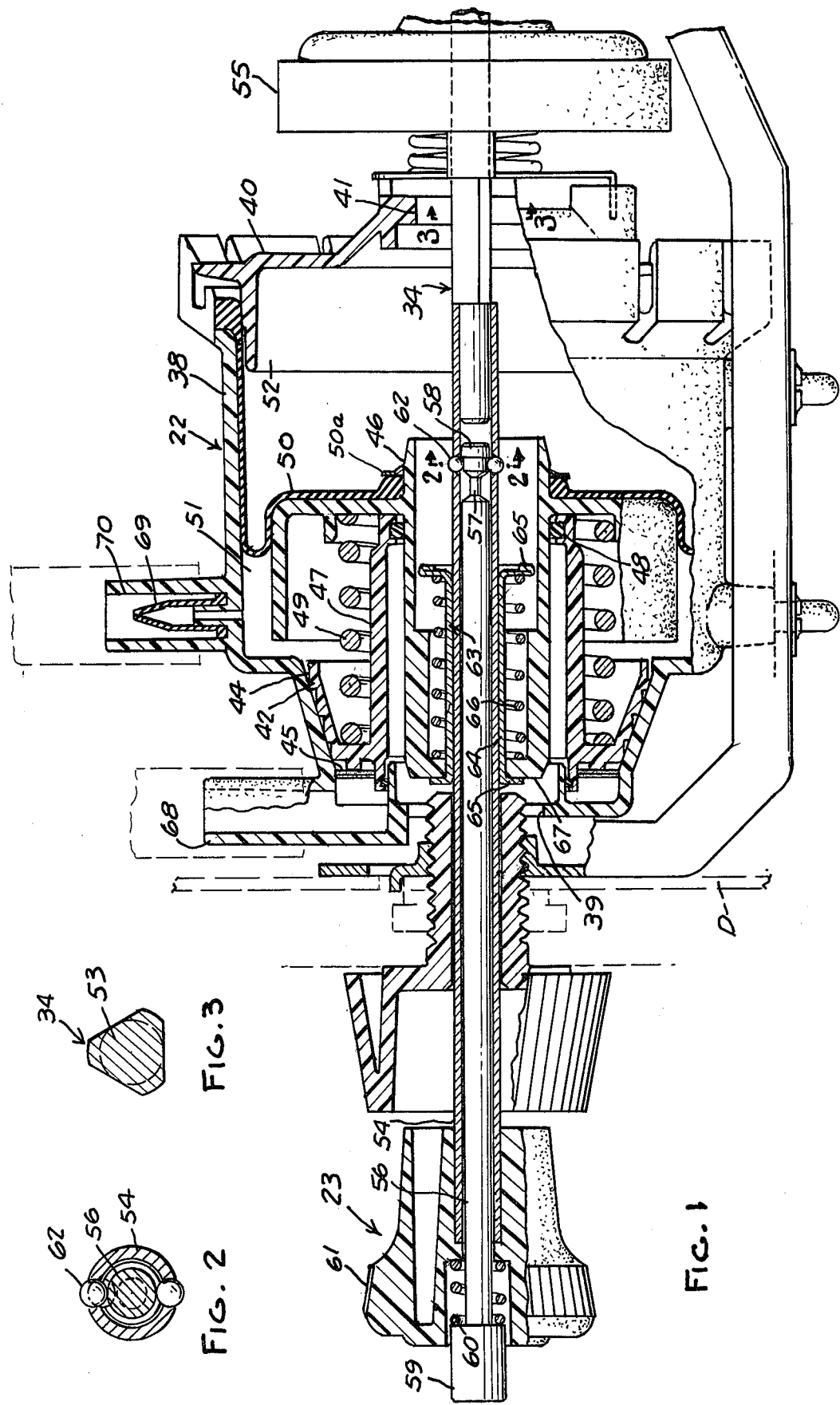

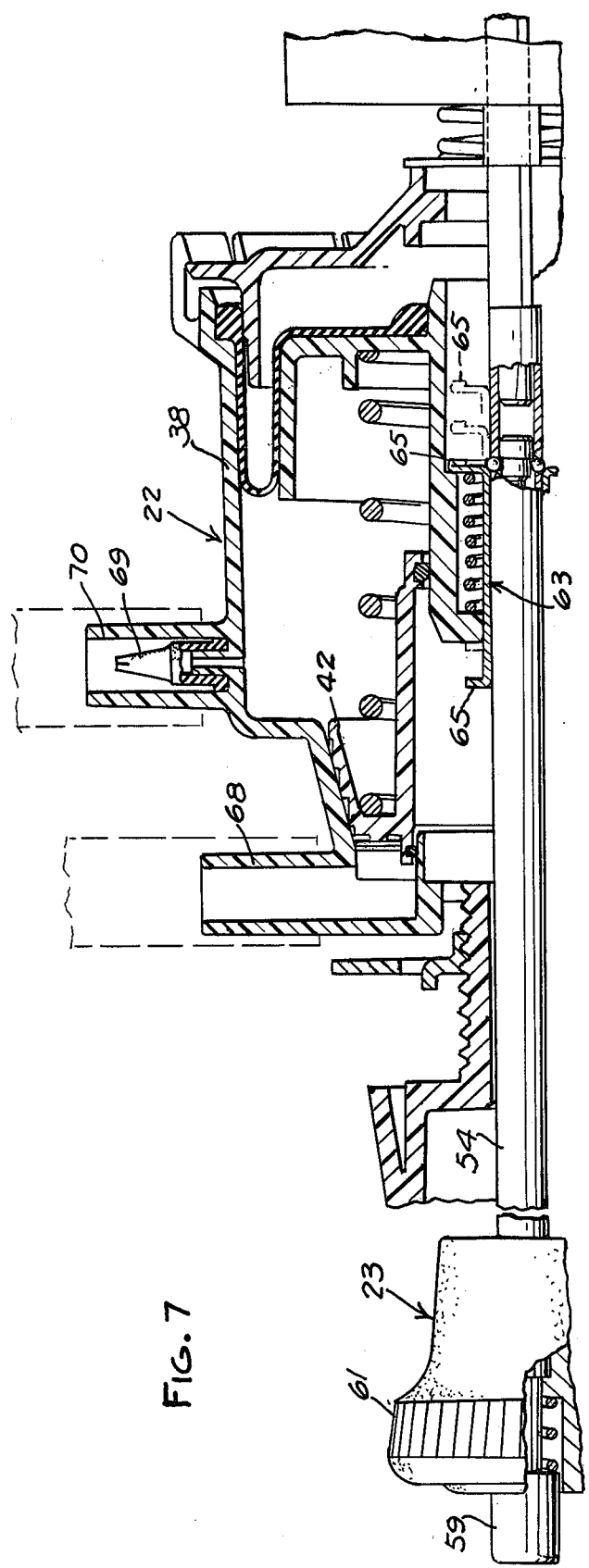

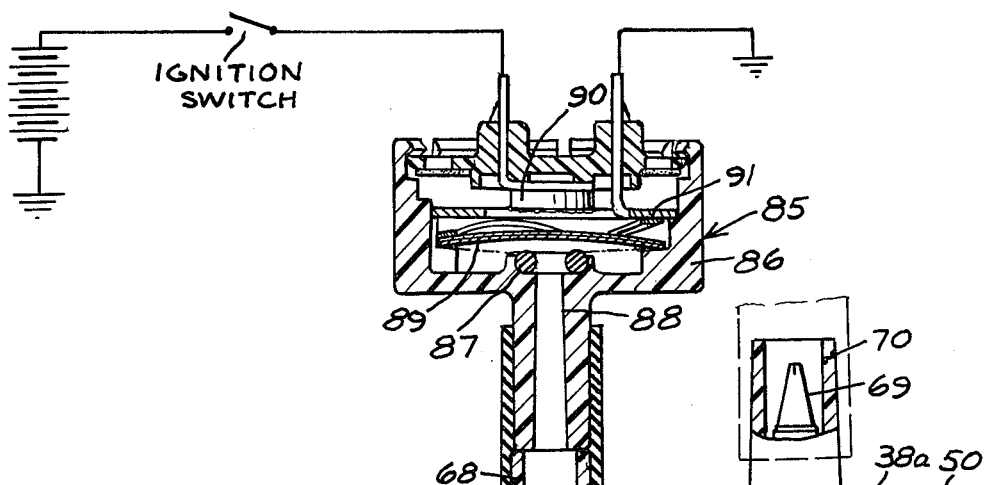
FIG. 11
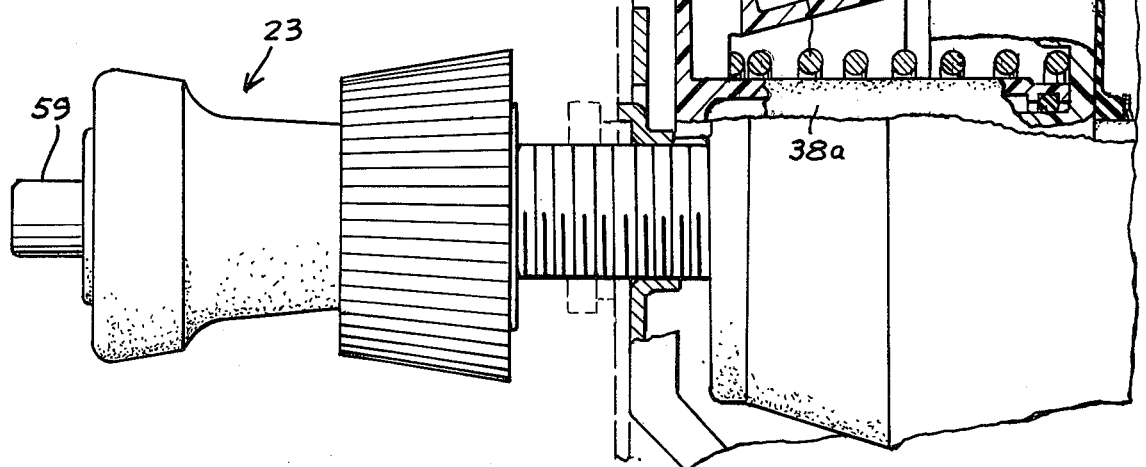
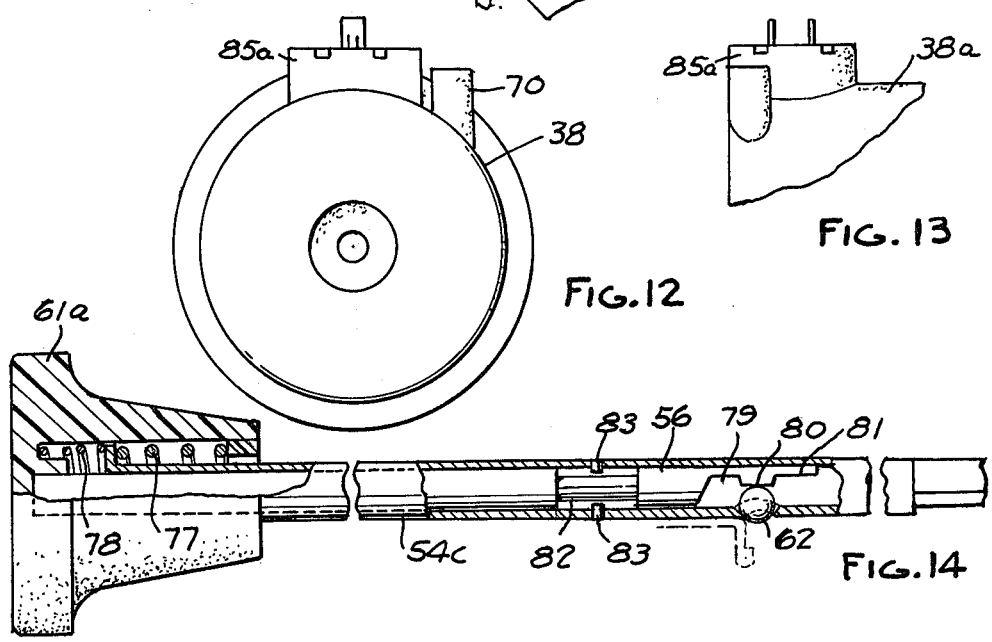
FIG. 12
FIG. 13
FIG. 14

HEADLAMP AUTOMATIC DELAY SYSTEM

This invention relates to an automatic system for turning off the headlamps of an automotive vehicle after a predetermined delay, subsequent to engine shutdown and particularly to such a system that utilizes vacuum.

BACKGROUND AND SUMMARY OF THE INVENTION

It has heretofore been suggested that it would be desirable to have a system that would turn the headlamps of a vehicle off anytime the engine is turned off. Such a system safeguards the automotive battery and prevents it from dissipating its energy if the headlamps are inadvertently left on and also offers the convenience and safety of walking away from a parked vehicle while within the area illuminated by the headlamps.

It has heretofore been suggested in U.S. Pat. No. 3,039,020 that vacuum might be utilized to accomplish this action. However, as far as I am aware, such a system has not been commercially successful and the systems which have been used have been of the electrical type and involve cost and maintenance problems.

Accordingly, the present invention is directed toward providing a headlamp delay system which will effectively extinguish the headlamps after a predetermined time delay after the engine is stopped; which is low in cost and easily maintained; which can be readily manually overridden; which can be installed by conventional techniques presently used in installing headlamp switches and the associated knob assemblies; and which may corporate an electrical interlock to prevent inadvertent headlamp turn-off during extended full throttle operation where the vacuum is reduced.

DESCRIPTION OF THE DRAWINGS

FIGS. 1 and 1a are part sectional side elevational views of a headlamp delay device embodying the invention.

FIG. 2 is a sectional view on an enlarged scale taken along the line 2—2 in FIG. 1.

FIG. 3 is a sectional view on an enlarged scale taken along the line 3—3 in FIG. 1.

FIG. 4 is a fragmentary sectional view taken along the line 4—4 in FIG. 1a.

FIG. 7 is a fragmentary sectional view of the device shown in FIG. 1 showing the parts in a different operative position.

FIG. 8 is a fragmentary sectional view of a modified portion of the device.

FIG. 9 is a fragmentary sectional view of a further modified portion of the device.

FIG. 10 is a sectional view taken along the line 10—10 in FIG. 9.

FIG. 11 is a fragmentary sectional view of a modified form of the device showing diagrammatically a connection to the ignition system.

FIG. 12 is an end view of a modified form of the invention shown in FIG. 11 on a reduced scale.

FIG. 13 is a fragmentary side elevational view of the device shown in FIG. 12.

FIG. 14 is a fragmentary sectional view of a modified portion of a device embodying the invention.

DESCRIPTION

Figure 1A:
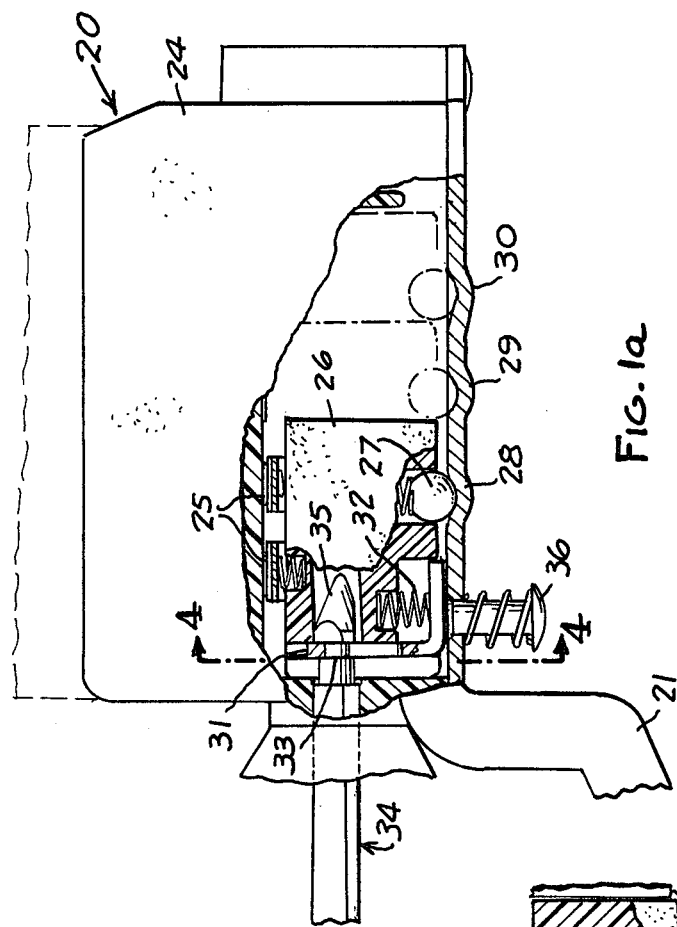

Referring to FIGS. 1 and 1a, the headlamp delay system embodying the invention comprises a headlamp switch 20 which is a conventional construction as is presently used in automotive vehicles mounted on a bracket 21 that is in turn mounted on the dashboard D of the vehicle. A vacuum assembly 22 is also supported by the bracket behind the dashboard D and a knob assembly 23 extends from in front of the dashboard D through the vacuum assembly 22 and connects with the switch 20.

Figure 4:
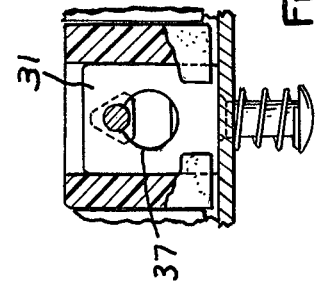

The switch 20 includes a body 24 supporting spaced contacts 25 and a movable switch element 26 that is adapted to engage the contacts as it is moved axially to different positions of the headlamp switch to a parking or driving position. A spring loaded ball 27 on the switch element or slide 26 engages successive detents 28, 29, 30 in the bracket 21 to hold the slide 26 in each of the positions. The connection between the knob assembly 23 and the slide member 26 is made by a transversely extending plate 31 that is yieldingly urged by a spring 32 into engagement with a groove 33 in the end of the shaft 34 of the knob assembly. The free end 35 of the shaft is tapered to facilitate assembly, as presently described. The shaft 34 can be disconnected from the slide 26 by manipulating spring loaded plunger 36 to move the plate 31 transversely permitting the shaft to be removed through an opening 37 in the plate 31 (FIG. 4).

Figure 5:
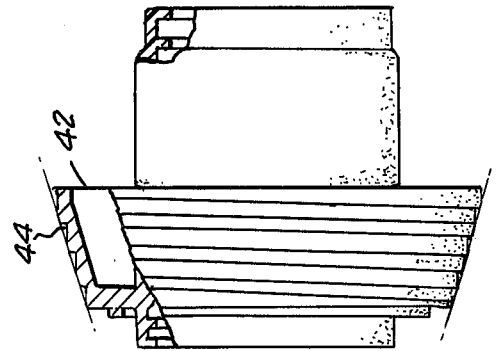
FIG. 5 is a part sectional side elevational view of a portion of the device.

Referring to FIG. 1, the vacuum assembly 22 comprises a housing 38 that has an opening 39 at one end and a cover 40 at the other end with an opening 41. A delay body 42 which is generally frusto-conical is positioned at one end of the body 38 adjacent a frusto-conical portion 43. The body 42 includes a spiral groove 44 (FIG. 5) that functions in cooperation with the inner surface of the frusto-conical portion 43 to define a predetermined orifice for metering the passage of air, as presently described. A filter 45 is interposed between the end of the body 42 and the housing 38. The body 38 further includes a passage 68 communicating with the filter area 45 and extending to atmosphere.

A piston 46 is slidable within a cylindrical portion 47 of the body 42, a seal being formed between the cylindrical portion 47 of body 42 and the piston 46 by an O-ring 48. A spring 49 is interposed between the body 42 and the piston 46 and tends to yieldingly urge the piston 46 to the right as viewed in FIG. 1. Spring 49 reacts in the opposite direction to hold body 42 in engagement with portion 43. A rolling diaphragm 50 is clamped between the end of the housing 38 and cover 40 and engages the piston 46 to divide the interior of the housing into two chambers 51, 52 of varying configuration depending upon the position of the piston. A snap ring 50a may be employed to maintain engagement of the diaphragm 50 with the piston 46.

As previously indicated, the knob assembly 23 includes a shaft 34. The shaft 34 has the portion adjacent the free end of triangular cross section as shown at 53 (FIG. 3) and the remaining portion tubular as at 54. The triangular portion 53 extends through a rheostat 55 which conventionally forms part of the switch 20 to permit varying the intensity of the illumination of the dashboard lights associated therewith, as is well-known in the art.

A pin 56 extends axially through the tubular portion 54 of the shaft 34 and has a portion 57 of reduced cross section spaced from the end thereof and an enlarged portion 58 at the end. A button 59 is provided on the end of the pin 56 and the spring 60 is interposed between the knob 61 on the shaft portion 54 and the button 59 to yieldingly urge the pin 56 to the left as viewed in FIG. 1. Balls 62 extend through beveled openings in the tubular shaft portion 54 and are normally urged outwardly as viewed in FIG. 1 by the portion of the pin between the reduced diameter portion 57 and the enlarged head 58. Engagement of the enlarged portion 58 with the balls 62 limits the outward movement of the pin 56. The openings in which the balls 62 are positioned taper inwardly toward the periphery of the tubular portion 54 so that the balls 62 will not fall out.

A spring capsule assembly 63 is provided between the piston 46 and surrounding the shaft portion 54. The capsule assembly 63 includes a tubular body portion 64 having flanges 65 through which the shaft 54 extends and a spring 66 interposed between a flange 67 on the piston and one of the flanges 65.

In addition, a resilient duck bill valve 69 is provided in a passage 70 communicating with the chamber 51. This passage area 70 is intended to be connected to a source of vacuum such as the intake manifold or vacuum pump of the vehicle.

When the engine of the vehicle is not operating and the headlamps are off, the knob assembly 23 would be in the position such as shown in FIG. 7 and the piston 46 of the vacuum assembly 22 would be to the right. When the engine is started and vacuum is applied through the passage 70, the vacuum causes the piston 46 to move to the left as viewed in FIG. 1.

If the driver then operates the headlamps by pulling the knob 61 to the left, the switch 20 will be operated to energize the headlamps, moving slide 26 to the position shown in FIG. 1a. At the same time, the shaft will have moved the ball 62 to a position adjacent the flange 65 of the capsule assembly 63.

If the engine is then turned off, thus cutting off the vacuum, air will begin to seep through the passage 68 and filter 45 and groove 44 into the chamber 51, tending to permit the spring 49 to move the piston 46 to the right as viewed in FIG. 1. Initial movement of the piston 46 will cause the capsule to engage the ball 62. Further movement of the piston 46 will compress the spring 66 until the position shown in FIG. 7 is reached. As the force is stored in the spring 66 and becomes sufficient to overcome the detent 28 (FIG. 1a), the shaft 34 will be moved to the right, moving the slide 26 to the next detent 29 which is the parking light position. Further dissipation of vacuum in the chamber 51 will again cause the spring 66 to be compressed until the force is sufficient to overcome the force of the ball 27 on detent 29 and then the shaft 34 will again be moved by a positive action to the right moving the switch slide 26 to the detent 30 turning the lights completely off. The spring capsule 63 insures that the switch contacts 25 are opened rapidly to preclude electrical arcing and subsequent contact erosion.

It can thus be seen that the system functions to positively and predictably turn the lights off after predetermined time delays.

Figure 6:
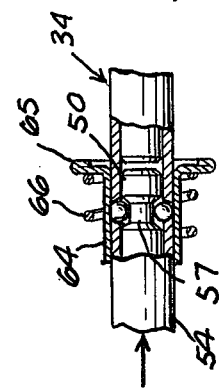
FIG. 6 is a view of the portion of the device shown in a different operative position.

In the event that for some reason it is desired to turn the lights on when the engine is not operating, or if the vacuum connection to passage 70 malfunctions, the device can be overriden by either pulling the knob 61 outwardly against the action of the spring 49 or preferably by depressing the button 59 to move the pin axially to the right as viewed in FIG. 1 permitting the ball 62 to move into the portion of reduced diameter. As shown in FIG. 6, the lights will then be operated manually without interference of the action of the spring 49 and the entire vacuum assembly will have been overridden until such time as vacuum is again applied to the passage 70 and the piston 46 moves to the left permitting the balls 62 to move outwardly under the action of the spring 60. Sufficient travel is designed into the device to enable normal operation of the switch between the headlamps "ON" and "ALL LIGHTS OFF" position, while in the override position.

It can be seen that the bracket 21 with the associated switch 20 and vacuum assembly 22 can be mounted to the rear of the dashboard D before the knob assembly 23 is inserted. After mounting of the bracket 21, the knob assembly 23 can then be inserted from the front of the dashboard axially through the vacuum assembly 22 into the switch where the tapered end of the shaft will cam the plate 31 transversely until the plate 31 shifts back into engagement with the groove 33. During insertion push putton 59 is naturally depressed which allows the balls 62 to enter the spring capsule 63 and the stem end 35 to enter and lock into the switch 20 in one smooth displacement.

In the form of the invention shown in FIG. 8, the connection between the pin 56a and tubular portion 54a of the shaft 34a is made by having a reduced milled portion 70 and a flat portion 71 that cams the ball 62 outwardly. In this form, the movement of the pin 56a is limited by a transverse pin 72 in tubular shaft 54a that extends into an axial groove 73 in the pin. This construction avoids a swaging operation to retain the balls 62 as required in shaft 54. A ball end mill may be used to machine a spherical ball seat 62a into shaft 54a thereby enabling ball 62 to be installed thru hole 101 into seat 102 prior to insertion of shaft 56a.

In the form shown in FIGS. 9 and 10, the movement of the pin 56b is limited by a portion 74 bent radially inwardly from the side wall 54b of the shaft. The portion 74 extends into a portion 76 of reduced diameter.

In the modified form shown in FIG. 14, instead of utilizing a button 59, the knob 61a is held on the end of the tubular shaft 54c by a spring 77 interposed between a flange on the knob 61a and a flange on the tube 54c which normally yieldingly urges the knob 61a axially inwardly. A light spring 78 is interposed between the flange on the tube 54c and the knob 61a to normally urge the knob 61a axially outwardly of the shaft to normally position pin 56c such that portion 80 is beneath ball 62 maintaining ball 62 extended outward to engage spring capsule 63. In this form, in order to override the action of the vacuum assembly, the knob 61a is pushed axially inwardly or outwardly causing the ball 62 to be retracted. As shown in this form, the ball 62 is adapted to function with portions 79, 80 and 81 on the pin 56c. The axial movement of the pin 56c is limited by pins 83 extending radially inwardly into an area of reduced cross section 82 of the pin 56c.

In order to prevent the headlamps from being turned off during extended full throttle operation when the vacuum is reduced, a structure such as shown in FIG. 11 may be used in association with the air inlet 68. An electrically operated device 85 is provided in communication with the inlet 68 and can be made as an integral part of the housing 38a if desired. The device 85 includes a body 86 having an O-ring 87 at one end of the passage 88 that communicates with the passage 68. A bi-metallic disc 89 is associated with the O-ring 87.

A PTC type heater disc 90 is mounted on body 86 and is connected such that it is energized when the ignition system of the vehicle is on. A PTC disc comprises a positive temperature coefficient semiconductor which is self-regulating to maintain temperature. When the engine is operating, the heater 90 radiates heat to a metal ring 91 that heats the bi-metal disc 89 to cause it to engage the O-ring 87 and prevent air from entering passage 88. Thus, as long as the ignition switch is on, air may not pass through passage 88 and in turn passage 68 to dissipate the vacuum in chamber 51. However, when the engine is turned off, the bi-metal disc 89 cools and moves away from the O-ring 87 permitting the air to pass inwardly and dissipate the vacuum so that the headlamps will be turned off.

In this form, the delay body 45 is eliminated and spring 49 is interposed between housing 38a and piston 46.

In the form shown in FIGS. 12 and 13, switch 85a is made integral with housing 38a.

I claim:

1. In a headlamp delay device, the combination comprising
    a switch having spaced contacts,
    a switch contact member movable to successively engage said contacts at different positions,
    a plurality of detent means for holding said contact member in each of said positions with a predetermined force,
    a housing,
    piston means dividing said housing into two chambers,
    a passage associated with one of said chambers for connection to a source of vacuum,
    an inlet to said one chamber,
    an orifice associated with said inlet to said chamber for connection to a source of pressure higher than that supplied through said vacuum,
    spring means yieldingly urging said piston means in a direction opposite to that which the vacuum tends to move said piston means,
    a shaft extending through said housing through said piston means and connected to said switch contact member,
    energy storing means interposed between the shaft and the piston means and operable by the piston means upon dissipation of the vacuum and functioning of said spring means to move said piston means to store energy when the vacuum is being dissipated such that upon predetermined storage of energy, the energy storing means functions to move the shaft and in turn the contact member within the switch against the action of the detent means successively storing energy and moving the shaft against the action of successive detent means from one detent position to another.

2. The combination set forth in claim 1 including retractable abutment means between said energy storing means and said shaft operable when retracted to permit said shaft to be moved independently of said energy storing means.

3. The combination set forth in claim 2 wherein said retractable abutment means comprises a ball movable radially of said shaft and means for normally holding said ball in the outward position but operable to permit retraction of the ball so that the shaft may be moved independently of the energy storing means.

4. In a headlamp delay device, the combination comprising
    a switch having spaced contacts,
    a switch contact member movable to successively engage said contacts at different positions,
    detent means for holding said contact member in each of said positions with a predetermined force,
    a housing,
    piston means dividing said housing into two chambers,
    a passage associated with one of said chambers for connection to a source of vacuum,
    an inlet to said one chamber,
    an orifice associated with said inlet to said chamber for connection to a source of pressure higher than that supplied through said vacuum,
    spring means yieldingly urging said piston means in a direction opposite to that which the vacuum tends to move said piston means,
    a shaft extending through said housing through said piston means and connected to said switch contact member,
    energy storing means associated with said piston and operable upon dissipation of the vacuum and functioning of said spring means to store energy when the vacuum is being dissipated such that upon predetermined storage of energy, the energy storing means functions to move the shaft and in turn the contact member within the switch against the action of the detent means successively storing and moving the shaft from one detent position to another,
    a portion of said shaft being hollow,
    a pin extending through said hollow shaft,
    said hollow shaft having an opening in a wall thereof,
    a ball of greater diameter inserted in said opening,
    said pin having a portion of reduced cross section such that when said pin is moved axially inwardly, said ball moves to said portion of reduced cross section thereby permitting said shaft and said movable switch contact member to be moved axially independently of said energy storing means.

5. The combination set forth in claim 4 including additional spring means yieldingly urging said pin axially outwardly relative to said shaft such that relative axial inward movement of said pin permits said ball to move radially inwardly.

6. The combination set forth in claim 5 including a knob on said pin,
    said additional spring means being interposed between said knob and said shaft.

7. The combination set forth in claim 6 including added spring means yieldingly urging said knob axially inwardly relative to said shaft.

8. The combination set forth in claim 4 wherein said energy storing means comprises an axially movable member,
    and spring means interposed between said member and said piston means, said member being adapted to engage said ball under the action of said first mentioned spring means to move said shaft in a direction against the action of said detent means.

9. The combination set forth in claim 1 including a valve associated with said inlet to said first chamber and means operable to close said valve upon energization of electric means associated therewith.

10. In a headlamp delay device, the combination comprising a switch having spaced contacts,
a switch contact member movable to successively engage said contacts at different positions,
detent means for holding said contact member in each of said positions with a predetermined force,
a housing,
piston means dividing said housing into two chambers,
a passage associated with one of said chambers for connection to a source of vacuum,
an inlet to said one chamber,
an orifice associated with said inlet to said chamber for connection to a source of pressure higher than that supplied through said vacuum,
spring means yieldingly urging said piston means in a direction opposite to that which the vacuum tends to move said piston means,
a shaft extending through said housing through said piston means and connected to said switch contact member,
energy storing means associated with said piston and operable upon dissipation of the vacuum and functioning of said spring means to store energy when the vacuum is being dissipated such that upon predetermined storage of energy, the energy storing means functions to move the shaft and in turn the contact member within the switch against the action of the detent means successively storing and moving the shaft from one detent position to another,
a valve associated with said inlet to said first chamber and means operable to close said valve upon energization of electric means associated therewith,
said electrical operating means for said valve comprising a thermostatic disc and a heater operable upon electrical energization to operate said disc and open said valve.

11. The combination set forth in claim 10 wherein said heater comprises a PTC device.

12. The combination set forth in claim 1 wherein said piston means includes a diaphragm.

13. In a headlamp delay device, the combination comprising
a bracket adapted to be mounted on a dashboard of a vehicle,
a switch mounted on said bracket and having spaced contacts,
a switch contact member movable to successively engage said contacts at different positions,
a plurality of detent means on said bracket for holding said contact member in each of said positions with a predetermined force,
a housing mounted on said bracket,
piston means dividing said housing into two chambers,
a passage associated with one of said chambers for connection to a source of vacuum,
said housing having an inlet to said one chamber,
a delay plug mounted in said one chamber and having a surface cooperating with a surface of said housing to define an orifice associated with said chamber for connection to a source of pressure higher than that supplied through said vacuum,
spring means yieldingly urging said piston means in a direction opposite to that which the vacuum tends to move said piston means,
a shaft extending through said housing through said piston means,
means connecting said shaft to said switch contact member and releasable to permit axial removal of said shaft relative to said switch,
energy storing means interposed between the shaft and the associated piston means and operable by said piston means upon dissipation of the vacuum and functioning of said spring means to move said piston means to store energy when the vacuum is being dissipated such that upon predetermined storage of energy, the energy storing means functions to move the shaft and in turn the contact member within the switch against the action of the detent means successively storing energy and moving the shaft against the action of successive detent means from one detent position to another.

14. The combination set forth in claim 13 including retractable abutment means between said energy storing means and said shaft operable when retracted to permit said shaft to be moved independently of said energy storing means.

15. In a headlamp delay device, the combination comprising
a bracket adapted to be mounted on a dashboard of a vehicle,
a switch mounted on said bracket and having spaced contacts,
a switch contact member movable to successively engage said contacts at different positions,
detent means on said bracket for holding said contact member in each of said positions with a predetermined force,
a housing mounted on said bracket,
piston means dividing said housing into two chambers,
a passage associated with one of said chambers for connection to a source of vacuum,
said housing having an inlet to said one chamber,
a delay plug mounted in said one chamber and having a surface cooperating with a surface of said housing to define an orifice associated with said chamber for connection to a source of pressure higher than that supplied through said vacuum,
spring means yieldingly urging said piston means in a direction opposite to that which the vacuum tends to move said piston means,
a shaft extending through said housing through said piston means,
means connecting said shaft to said switch contact member and releasable to permit axial removal of said shaft,
energy storing means associated with said piston and operable upon dissipation of the vacuum and functioning of said spring means to store energy when the vacuum is being dissipated such that upon predetermined storage of energy, the energy storing means functions to move the shaft and in turn the contact member within the switch against the action of the detent means successively storing and moving the shaft from one detent position to another,
retractable abutment means between said energy storing means and said shaft,
said retractable abutment means comprises a ball movable radially of said shaft and means for normally holding said ball in the outward position but operable to permit retraction of the ball so that the shaft may be moved independently of the energy storing means.

16. In a headlamp delay device, the combination comprising
a bracket adapted to be mounted on a dashboard of a vehicle,
a switch mounted on said bracket and having spaced contacts,
a switch contact member movable to successively engage said contacts at different positions,
detent means on said bracket for holding said contact member in each of said positions with a predetermined force,
a housing mounted on said bracket,
piston means dividing said housing into two chambers,
a passage associated with one of said chambers for connection to a source of vacuum,
said housing having an inlet to said one chamber,
a delay plug mounted in said one chamber and having a surface cooperating with a surface of said housing to define an orifice associated with said chamber for connection to a source of pressure higher than that supplied through said vacuum,
spring means yieldingly urging said piston means in a direction opposite to that which the vacuum tends to move said piston means,
a shaft extending through said housing through said piston means,
means connecting said shaft to said switch contact member and releasable to permit axial removal of said shaft,
energy storing means associated with said piston and operable upon dissipation of the vacuum and functioning of said spring means to store energy when the vacuum is being dissipated such that upon predetermined storage of energy, the energy storing means functions to move the shaft and in turn the contact member within the switch against the action of the detent means successively storing and moving the shaft from one detent position to another,
a portion of said shaft being hollow,
a pin extending through said hollow shaft,
said hollow shaft having an opening in a wall thereof,
a ball of greater diameter inserted in said opening,
said pin having a portion of reduced cross section such that when said pin is moved axially inwardly, said ball moves to said portion of reduced cross section thereby permitting said shaft and said movable switch contact member to be moved axially independently of said energy storing means.

17. The combination set forth in claim 16 including additional spring means yieldingly urging said pin axially outwardly relative to said shaft such that relative axial inward movement of said pin permits said ball to move radially inwardly.

18. The combination set forth in claim 17 including a knob on said pin,
said additional spring means being interposed between said knob and said shaft.

19. The combination set forth in claim 18 including added spring means yieldingly urging said knob axially inwardly relative to said shaft.

20. The combination set forth in claim 16 wherein said energy storing means comprises an axially movable member,
and spring means interposed between said member and said piston means, said member being adapted to engage said ball under the action of said first mentioned spring means to move said shaft in a direction against the action of said detent means.

21. The combination set forth in claim 13 including a valve associated with said inlet to said first chamber and means operable to close said valve upon energization of electric means associated therewith.

22. In a headlamp delay device, the combination comprising
a bracket adapted to be mounted on a dashboard of a vehicle,
a switch mounted on said bracket and having spaced contacts,
a switch contact member movable to successively engage said contacts at different positions,
detent means on said bracket for holding said contact member in each of said positions with a predetermined force,
a housing mounted on said bracket,
piston means dividing said housing into two chambers,
a passage associated with one of said chambers for connection to a source of vacuum,
said housing having an inlet to said one chamber,
a delay plug mounted in said one chamber and having a surface cooperating with a surface of said housing to define an orifice associated with said chamber for connection to a source of pressure higher than that supplied through said vacuum,
spring means yieldingly urging said piston means in a direction opposite to that which the vacuum tends to move said piston means,
a shaft extending through said housing through said piston means,
means connecting said shaft to said switch contact member and releasable to permit axial removal of said shaft,
energy storing means associated with said piston and operable upon dissipation of the vacuum and functioning of said spring means to store energy when the vacuum is being dissipated such that upon predetermined storage of energy, the energy storing means functions to move the shaft and in turn the contact member within the switch against the action of the detent means successively storing and moving the shaft from one detent position to another,
a valve associated with said inlet to said first chamber and means operable to close said valve upon energization of electrical means associated therewith,
said electrical operating means for said valve comprises a thermostatic disc and a heater operable upon electrical energization to operate said disc and open said valve.

23. The combination set forth in claim 22 wherein said heater comprises a PTC device.

24. In a push button release device, the combination comprising
a hollow shaft,
a pin extending through said hollow shaft,
said hollow shaft having an opening in a wall thereof,
a ball of greater diameter inserted in said opening,
said pin having a portion of reduced cross section such that when said pin is moved axially inwardly, said ball moves to said portion of reduced cross section thereby permitting said shaft and a movable switch contact member to be moved axially independently of an energy storing means.

25. The combination set forth in claim 24 including additional spring means yieldingly urging said pin axially outwardly relative to said shaft such that relative axial inward movement of said pin permits said ball to move radially inwardly.

26. The combination set forth in claim 25 including a knob on said pin,
said additional spring means being interposed between said knob and said shaft.

27. The combination set forth in claim 26 including added spring means yieldingly urging said knob axially inwardly relative to said shaft.

28. The combination set forth in claim 24 wherein said opening for said ball is made by milling through an opposite wall of said hollow shaft radially inwardly such that the opening has an inwardly facing spherical ball seal.

29. The combination set forth in claim 24 wherein said portion of reduced cross section comprises an annular groove.

30. The combination set forth in claim 24 wherein said portion of reduced cross section comprises a flat in said pin.

31. The combination set forth in claim 24 including means for limiting the axial movement of said pin comprising means on said hollow shaft extending radially inwardly,
said pin having a portion thereof having ends adapted to be engaged by said means.

32. The combination set forth in claim 31 wherein said means comprises a pin.

33. The combination set forth in claim 31 wherein said means comprises slits in said hollow shaft and the portion between said slits being deformed radially inwardly.

* * * * *